United States Patent [19]
Chen et al.

[11] Patent Number: 6,165,553
[45] Date of Patent: Dec. 26, 2000

[54] METHOD OF FABRICATING CERAMIC MEMBRANES

[75] Inventors: Chieh-Cheng Chen, Getzville; Ravi Prasad, East Amherst, both of N.Y.

[73] Assignee: Praxair Technology, Inc., Danbury, Conn.

[21] Appl. No.: 09/140,452

[22] Filed: Aug. 26, 1998

[51] Int. Cl.$^7$ ....................................................... B05D 3/02
[52] U.S. Cl. ........................ 427/240; 427/245; 427/226; 427/376.2; 427/380; 427/419.2; 427/419.5
[58] Field of Search ................................... 427/2.27, 240, 427/245, 376.1, 376.2, 376.3, 376.6, 419.2, 419.5, 419.8, 380, 387, 226

[56] References Cited

U.S. PATENT DOCUMENTS

| | | | |
|---|---|---|---|
| 3,330,697 | 7/1967 | Pechini | 117/215 |
| 3,936,383 | 2/1976 | Daimon et al. | 252/63 |
| 4,859,525 | 8/1989 | Hench et al. | 427/215 |
| 4,921,731 | 5/1990 | Clark et al. | 427/314 |
| 4,957,888 | 9/1990 | Brand et al. | 501/134 |
| 5,061,682 | 10/1991 | Aksay et al. | 505/1 |
| 5,114,702 | 5/1992 | Pederson et al. | 423/639 |
| 5,147,515 | 9/1992 | Hanagata et al. | 204/164 |
| 5,196,388 | 3/1993 | Shyu | 501/134 |
| 5,240,480 | 8/1993 | Thorogood et al. | 96/4 |
| 5,242,631 | 9/1993 | Iyer et al. | 264/0.5 |
| 5,342,431 | 8/1994 | Anderson et al. | 95/45 |
| 5,352,481 | 10/1994 | Bak et al. | 427/212 |
| 5,358,695 | 10/1994 | Helble et al. | 423/592 |
| 5,439,706 | 8/1995 | Richards et al. | 427/244 |
| 5,494,700 | 2/1996 | Anderson et al. | 427/115 |
| 5,569,633 | 10/1996 | Carolan et al. | 502/4 |
| 5,585,136 | 12/1996 | Barrow et al. | 427/2.24 |
| 5,611,931 | 3/1997 | Liu et al. | 210/653 |
| 5,702,999 | 12/1997 | Mazanec et al. | 501/152 |
| 5,712,220 | 1/1998 | Carolan et al. | 502/400 |
| 5,733,435 | 3/1998 | Prasad et al. | 205/765 |

OTHER PUBLICATIONS

Teraoka et al., "Preparation of Dense Film of Perovskite–Type Oxide on Porous Substrate", Kyushu University, Japan, vol. 97, No. 5, 1989 (No Month).

Singhal et al., "Solid Oxide Fuel Cells", First International Symposium, The Electrochemical Society, Inc., Proceedings, vol. 89–11 (No Date).

Klier et al., "Theory of Exchange Reactions between Fluids and Solids with Tracer Diffusion in the Solid", J. Physt. Chem. Solids, pp. 1087–1095, vol. 27(1966) (No Month).

Aksay, "Molecular and Colloidal Engineering of Ceramics", Ceramics International, pp. 267–274, vol. 17(1991) (No Month).

Chiang et al., "Direct Preparation of Uniform $YBa_2Cu_3O_{7-y}$ Powders", Journal of Material Science, pp. 1473–1474(1990) (No Month).

Baythoun, "Production of Strontium–Substituted Lanthanum Manganite Perovskite Powder by the Amorphous Citrate Process", Journal of Materials Science, pp. 2757–2769(1982) (No Month).

*Primary Examiner*—Shrive Beck
*Assistant Examiner*—Kirsten A. Crockford
*Attorney, Agent, or Firm*—David M. Rosenblum

[57] ABSTRACT

A method of fabricating a dense membrane by providing a colloidal suspension of a ceramic powder, and providing a polymeric precursor. The precursor is mixed together with the colloidal suspension, and the mixture is applied to a membrane support to form a composite structure. The composite structure is heated to form a dense membrane on the support.

20 Claims, 3 Drawing Sheets

METHOD OF FABRICATING CERAMIC MEMBRANES

U.S. GOVERNMENT RIGHTS

This invention was made with United States Government support under Cooperative Agreement No. 70NANB5H1065 awarded by the National Institute of Standards and Technology. The United States Government has certain rights in the invention.

FIELD OF THE INVENTION

This invention relates to the production of ceramic membranes and more particularly to the deposition of thin ion transport membranes over porous substrates.

BACKGROUND OF THE INVENTION

Solid electrolyte ionic conductors, also referred to as ion transport membranes, can be utilized to separate oxygen from gas mixtures containing oxygen. Mixed conductors are materials that conduct both oxygen ions and electrons and appear to be well suited for oxygen separation since they can be operated in a pressure driven mode, in which oxygen transport is driven by a difference in oxygen activity, also referred to as oxygen partial pressure, on the two sides of the membrane. Perovskites such as $La_{1-x}Sr_xCoO_{3-y}$, $La_xSr_{1-x}FeO_{3-y}$, and $La_xSr_{1-x}Fe_{1-y}Co_yO_{3-z}$ are examples of mixed conductors. At elevated temperatures, these materials contain mobile oxygen-ion vacancies that provide conduction sites for transport of oxygen ions through the material. These materials transport oxygen ions selectively, and can thus act as a membrane with an infinite selectivity for oxygen.

Thin electrolyte films are highly desirable because the ideal oxygen flux is inversely proportional to the thickness. Thus thinner films could lead to higher oxygen fluxes, reduced area, lower operating temperatures and smaller oxygen pressure differentials across the electrolyte.

Solid state gas separation membranes formed by depositing a dense mixed conducting oxide layer onto a relatively thick porous mixed conducting support were investigated by Teraoka et. al. as disclosed in the Journal Ceram. Soc. Japan, International Ed, Vol. 97, No. 5 (1989). The relatively thick porous mixed conducting support provides mechanical stability for the thin, relatively fragile, dense mixed conducting layers. $La_{0.6}Sr_{0.4}CoO_3$ thin films were deposited onto porous supports of the same material by an rf sputtering technique and a liquid suspension spray deposition method. Films produced by the sputtering method were cracked and porous. Films (approximately 15 $\mu$m thick) made by the liquid suspension spray followed by sintering at 1400° C. were dense and crack-free.

Teraoka and coworkers expected the oxygen flux to increase by a factor of 10 for the composite thin film membrane compared to a dense disk. However, they obtained an increase of less than a factor of two.

Pal et al. disclosed an EVD process in a paper entitled "Electrochemical Vapor Deposition of Yttria-Stabilized Zirconia Films" wherein a yttria-stabilized zirconia ("YSZ") film is deposited onto a porous substrate. EVD is a modification of the conventional chemical vapor deposition ("CVD") process which utilizes a chemical potential gradient to grow thin, gas impervious metal oxide films on porous substrates. The EVD process involves contacting a mixture of metal halides on one side of a porous substrate and a mixture of hydrogen and water on the opposite side. The reactants diffuse into the substrate pores and react to form the multi-component metal oxide which is deposited on the pore wall. Continued deposition causes pore narrowing until eventually the pores become plugged with the multi-component metal oxide. The primary application of EVD to date has been in the fabrication of solid electrolyte YSZ, and the interconnector material lanthanum chromium oxides as used in solid oxide fuel cells ("SOFCs").

Richards et al. in U.S. Pat. No. 5,240,480 disclosed an organometallic chemical deposition (OMCVD) method to prepare thin films of muti-component metallic oxides for use as inorganic membranes. The inorganic membranes are formed by reacting organometallic complexes corresponding to each of the respective metals and an oxidizing agent under conditions sufficient to deposit a thin membrane onto the porous substrate. Both EVD and OMCVD process involve expensive and complex equipment and often toxic and expensive precursor materials. Furthermore, for multi-component metallic oxides (e.g. mixed conducting perovskites), stoichiometry control of the oxide film is difficult for these processes.

Thorogood et. al. in U.S. Pat. No. 5,240,480 investigated multi-layer composite solid state membranes which are capable of separating oxygen from oxygen-containing gaseous mixtures at elevated temperatures. The membranes comprise a multi-component metallic oxide porous layer having an average pore radius of less than approximately 10 $\mu$m and a multi-component metallic oxide dense layer having no connected-through porosity wherein the porous and dense layers are contiguous and such layers conduct electrons and oxygen ions at operating temperatures.

Carolan et al. in U.S. Pat. No. 5,569,633 investigated surface catalyzed multi-layer ion transport membranes consisting of a dense mixed conducting multi-component metallic oxide layer, and combinations of porous ion conducting and porous mixed ion and electron conducting layers. Significant oxygen flux was demonstrated by these prior art ion transport membranes in which catalysts were deposited onto the oxidizing surface of the composite membrane. Coating on both sides of the membrane did not enhance the oxygen flux.

Anderson et al. in U.S. Pat. No. 5,494,700, which is incorporated herein by reference, disclose synthesis of a precipitate-free aqueous solution containing a metal ion and a polymerizable organic solvent to fabricate dense crack-free thin films (<0.5 $\mu$m/coating) on dense/porous substrates for solid oxide fuel cell and gas separation applications. First, a precipitate-free starting solution is prepared containing cations of oxide constituents dissolved in an aqueous mixture comprising a polymerizable organic solvent. The precursor film is deposited on the substrate by spin-coating technique followed by drying and calcining in the presence of oxygen and at the temperature not in excess of 600° C. to convert the film of polymeric precursor into the metal oxide film.

The polymeric precursor method disclosed by Anderson et al. is a cost-effective approach and is easy to scale up for manufacturing. However, the upper thickness limit for a single coating is typically below 0.5 $\mu$m for this method. Films greater than 0.5 $\mu$m usually generate cracks during the organics burn-off and sintering due to the large shrinkage mismatch between the film and the substrate. Also, the Anderson et al. method is mostly confined to producing dense films on planar substrates by spin coating technique using a precipitate-free aqueous solution. No test results were reported for gas separation applications.

An additional concern during production of composite membranes, having a dense thin film membrane deposited on a porous structured substrate, is that such membranes are prone to defects including tiny "pinholes" which are produced during the manufacturing operation. In general, the defect density tends to increase with higher processing speeds. Such defects are highly undesirable because they are non-selective, that is, they indiscriminately pass undesired components of a feed fluid. Such defects lower the selectivity of the ion transport film and result in diminished performance. The elimination of defects is hence essential to develop high performance composite films which can be economically produced at high processing speed.

Furthermore, in practice the kinetics of surface exchange processes impose resistances additional to ion transport bulk resistance and affect oxygen transport across the ion transport membrane. As the film becomes thinner, the proportion of the overall resistance due to the ion transport bulk resistance decreases while that due to surface exchange increases. As a consequence, surface exchange kinetics are likely to become the dominant resistance for very thin films (e.g. 5 $\mu$m or less). Therefore to get the full benefit of the thinner films, it is necessary to de-bottleneck the rate limitation imposed by the surface exchange processes. In summary, researchers are continuing their search for a cost-effective thin film technology for composite ion transport membranes which possess superior oxygen flux to enable their use in commercial processes.

OBJECTS OF THE INVENTION

It is therefore an object of the invention to provide an improved method of depositing a thin ceramic membrane on a porous support.

It is a further object of this invention to provide such a method which can be accomplished economically and in as few as one or two steps to produce a membrane having a thickness greater than 0.5 microns.

A still further object of this invention is to produce a ceramic membrane which mitigates limitations imposed by surface kinetics to obtain superior oxygen flux without using a surface catalyzed layer.

Yet another object of this invention is to eliminate defects in ceramic membranes to prevent non-ionic permeation through the membranes.

SUMMARY OF THE INVENTION

This invention comprises a method of fabricating a ceramic membrane by providing a colloidal suspension of a ceramic powder and providing a polymeric precursor. The precursor and the colloidal suspension are mixed together, and the mixture is applied to a membrane support to form a composite structure. The composite structure is heated to form a dense membrane on the support.

In a preferred embodiment the colloidal suspension includes a water-based solvent such as water or ethylene glycol. The ceramic powder has a mean particle size of less than 50 microns in diameter, and more preferably substantially all of the ceramic powder has a diameter less than 1 micron. More preferably, the colloidal suspension further includes at least one of a dispersant and a anti-foaming agent.

Preferably, providing the polymeric precursor includes preparing a solution by dissolving a plurality of metal cation source compounds in an aqueous mixture including a polymerizable organic solvent, and heating the solution to form the precursor as the polymer containing the metal cations. More preferably, the cations are the same as those in the ceramic powder in the colloidal suspension.

The support preferably is porous and has a porosity of at least 10 percent by volume, and more preferably has a porosity greater than 30 percent by volume. Heating the applied mixture includes drying it, preferably at 60–100° C. for 5–30 mins, on the support and then annealing it, preferably between 600 and 1400° C. for 2–4 hrs, to form the dense membrane on the substrate. More preferably, the annealing includes at least partially sintering the support.

In another preferred embodiment, the method of fabricating further includes eliminating defects in the formed dense membrane by preparing a second solution by dissolving a plurality of metal cation source compounds in an aqueous mixture including a polymerizable organic solvent, heating the second solution to form a sealing precursor as a polymer containing the metal cations, and applying the sealing precursor to the formed dense membrane to establish a film thereon. It is preferred that the metal cations are the same as those of the ceramic powder which is now part of the formed ceramic membrane. The method preferably further includes spinning the composite structure after the sealing precursor is applied, and then repeating the application and spinning cycle at least twice. The preferred size of crystals comprising the film is less than 100 nm, more preferably less than 50 nm, and most preferably equal to or less than 20 nm.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

Figure 1:
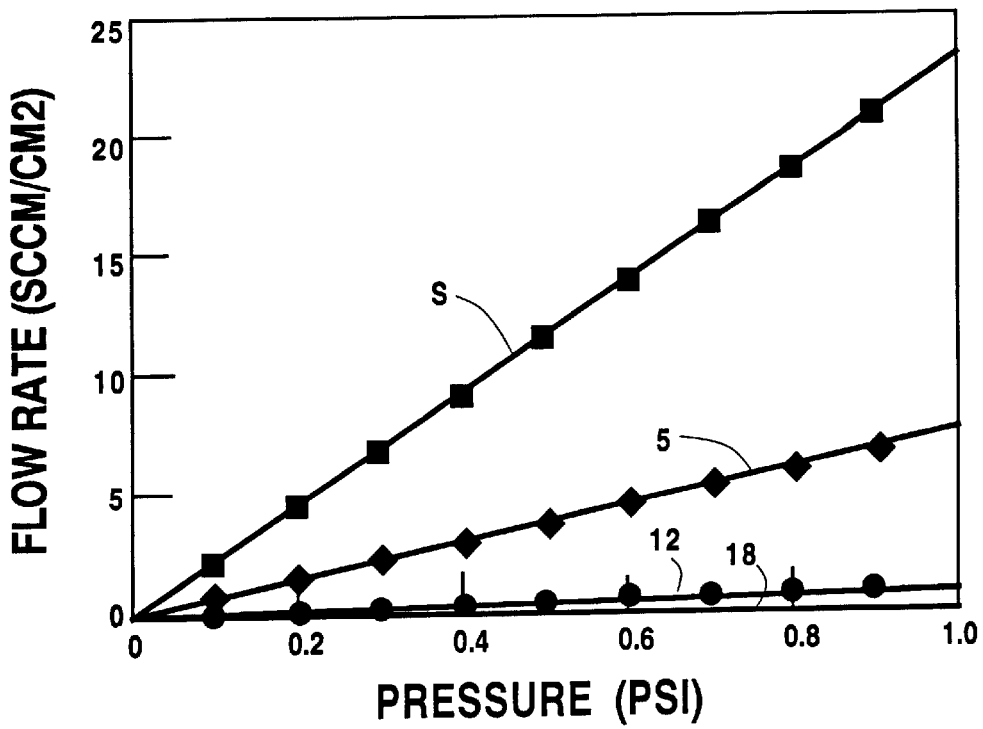
FIG. 1 is a graph of nitrogen permeability through an uncoated LSC substrate and after five, twelve and eighteen coating cycles according to one embodiment of the invention.

This invention comprises a method of fabricating a ceramic membrane by providing a colloidal suspension of a ceramic powder and providing a polymeric precursor. The precursor and the colloidal suspension are mixed together, and the mixture is applied to a membrane support to form a composite structure. The composite structure is heated to form a dense membrane on the support.

Another aspect of the invention involves eliminating defects in a formed dense membrane by preparing a solution by dissolving a plurality of metal cation source compounds in an aqueous mixture including a polymerizable organic solvent, heating the solution to form a sealing precursor as a polymer containing the metal cations, and applying the sealing precursor to the formed dense membrane.

One of the main purposes of this invention is to obtain crack-free ion transport films with the thickness greater than 0.5 $\mu$m using a single coating step, or only a few coating steps. In prior art, films greater than 0.5 $\mu$m usually generate cracks during the organics burn-off and sintering process due to the large shrinkage mismatch between the film and the substrate. The present invention combines a colloidal suspension of ceramic powder into a polymeric precursor to increase the inorganic content of the precursor and reduce the shrinkage mismatch between the membrane and substrate during sintering. The polymeric precursor may also serve as a binder and stabilization agent in the ion transport suspension to increase the stability of the system. Preferably, the composition of the polymeric precursor is substantially identical to that of the ion transport materials in the colloidal suspension to obtain a desired, uniform composition of the resulting membrane. By using this liquid precursor, a relatively thick (2–5 $\mu$m) ceramic membrane can be fabricated on a porous support in a single step.

Another purpose of present invention is to obtain fine grain (<0.5 $\mu$m) ion transport membranes at low temperatures in a cost-effective manner and to mitigate the limitations imposed by surface kinetics. The fine grain characteristics, also referred to herein as crystalline size, of the overcoat layer or film fabricated by present invention could increase the surface area accessible to the oxygen molecules in the gas phase. Nanocrystalline films of less than 100 nm, more preferably less than 50 nm, according to the present invention enhance surface exchange kinetics. Superior oxygen flux thus is obtained without using a surface catalyzed layer.

In this invention, the liquid precursor is not restricted to a precipitate-free aqueous solution and the substrate is not restricted to the planar geometry. Also, the thickness for a single coating can be greater than 0.5 $\mu$m by introducing the ion transport colloidal suspension into the polymeric precursor to increase the inorganic content of the system and reduce the shrinkage during sintering. The coating methods for applying the suspension include spin coating, dip coating, and spray coating. The geometry of the substrate can be tubular or complex shapes.

The present invention utilizes the special properties of a liquid precursor in several ways. At low temperatures the precursor forms a viscous liquid with excellent wetting properties to form a uniform coating on the surface of a substrate or an ion transport film on a substrate. The liquid precursor will selectively wick into the open pores and effectively plug them but yet leave only a very thin layer on the non-porous or non-defective area of the substrate or ion transport film, respectively, thus the increase in overall resistance due to the overcoat thickness should be minimal. The repaired ion transport film can be heated to an elevated temperature, either during manufacturing or in-situ in the final application, to sinter the polymeric precursor layer.

Table I summarizes the following examples with specific films and substrate materials for different composite film specimens to exemplify the invention and should not limit the invention in any way.

TABLE I

| Example | Film | Substrate | Results |
|---|---|---|---|
| 1 | LSC | Porous LSC-A (25% porosity, 0.5 mm thick) | i) Fabricated dense LSC film on porous substrate ii) Defects elimination of LSC composite film |

TABLE I-continued

| Example | Film | Substrate | Results |
|---|---|---|---|
| 2 | LSC | Porous LSC-A (32% porosity, 0.5 mm thick) | Increased porosity of porous support enhanced $O_2$ transport |
| 3 | LSC | Porous LSC-A (32% porosity, 0.3 mm thick) | Decreased thickness of porous support increased $O_2$ flux of composite film |
| 4 | LSCF | Dense LSCF (1 mm thick) | Enhance surface exchange kinetics by a nano-crystalline coating |
| 5 | LSFCRM | Porous LFCRM (32% porosity, 0.5 mm thick) | Fabricated dense LSFCRM film on porous substrate |
| 6 | LSC | Porous LSC-A (32% porosity, 0.5 mm thick) | Obtained thicker film (2–5 $\mu$m) in a single step |

EXAMPLE 1

Composite I

Fabrication of $La_{0.05}Sr_{0.95}CoO_3$ (LSC) Dense Film on Porous Substrate

Preparation of the Polymeric Precursor Solution

A polymeric precursor solution of $La_{0.05}Sr_{0.95}CoO_3$ containing 0.2 mole of the oxide was prepared as follows: 0.433 g of $La(NO_3)_3 \cdot 6H_2O$, 4.021 g of $Sr(NO_3)_2$, and 10.135 g of a 506.731 g sol/mole $Co(NO_3)_2$ solution were dissolved in 40 ml deionized water, one at a time, in 250 ml beaker with stirring. 3.0 g of glycine and 2.0 g of citric acid and 40 ml of ethylene glycol were then added to the solution and dissolved by stirring. The magenta-colored precursor was filtered through Fiserbrand medium Q5 filter paper. The precursor was heated in a 250 ml beaker at 80° C. to expel the water and other volatile matter. After 24 hours, the precursor was transferred to a 100 ml beaker and allowed to concentrate at 80° C. for 2 more days until the precursor viscosity was 92 centipoise ("cP") at room temperature.

Deposition and Formation of the Dense Film

A spin coating technique was used to form wet films of the precursor on the porous LSC-A substrates. LSC-A substrates were prepared by mixing $La_{0.05}Sr_{0.95}CoO_3$ powder (by Praxair Specialty Ceramics of Praxair Surface Technologies at Woodinville, Wash.) having a powder size of 1.2 $\mu$m and 20 wt. % of Ag powder (Degussa Corp.) having a size of approximately 1 $\mu$m, followed by pressing in a 1.5 inch (3.8 cm) die under a pressure of 10.4 kpsi and partial sintering at 950° C. to obtain the porous substrate with a porosity of about 25% and a thickness of 0.5 mm. A few drops of the viscous precursor were then deposited onto the polished surface of the substrate which was fixed on a spinning disk. A spinning speed of 3500 rpm for 10 seconds was used for film deposition. After spin-coating, the as-deposited film of precursor on the substrate was dried on a hot plate at 80° C. for 5 minutes, then transferred to a hot plate and heated at approximately 300° C. for at least 5 minutes. The entire spin-coating and drying process was repeated until a dense thin film formed on the substrate surface.

The effect of the number of spin-coating cycles on the leak rate of nitrogen at room temperature (about 25° C.) is shown in FIG. 1 for the composite film specimen. Line S represents nitrogen flow through the uncoated substrate, and lines 5, 12 and 18 (which lies along the x-axis) represent nitrogen flow after five, twelve and eighteen cycles, respectively. The leak rate decreased rather quickly before the fifth spin-coating cycle, and more slowly after that. Minimal leak rate was detected after 12 spin-coating cycles. A dense gas-tight LSC film (about 2 µm) was obtained on the porous LSC-A substrate after 18 spin-coating cycles, referred to hereinafter as Composite I. Composite I disc was then annealed at 600° C. for 2 hours to remove residual organics and form the crystalline oxide film for further high temperature permeation tests.

High Temperature Permeation Tests of Composite Film

Figure 2:
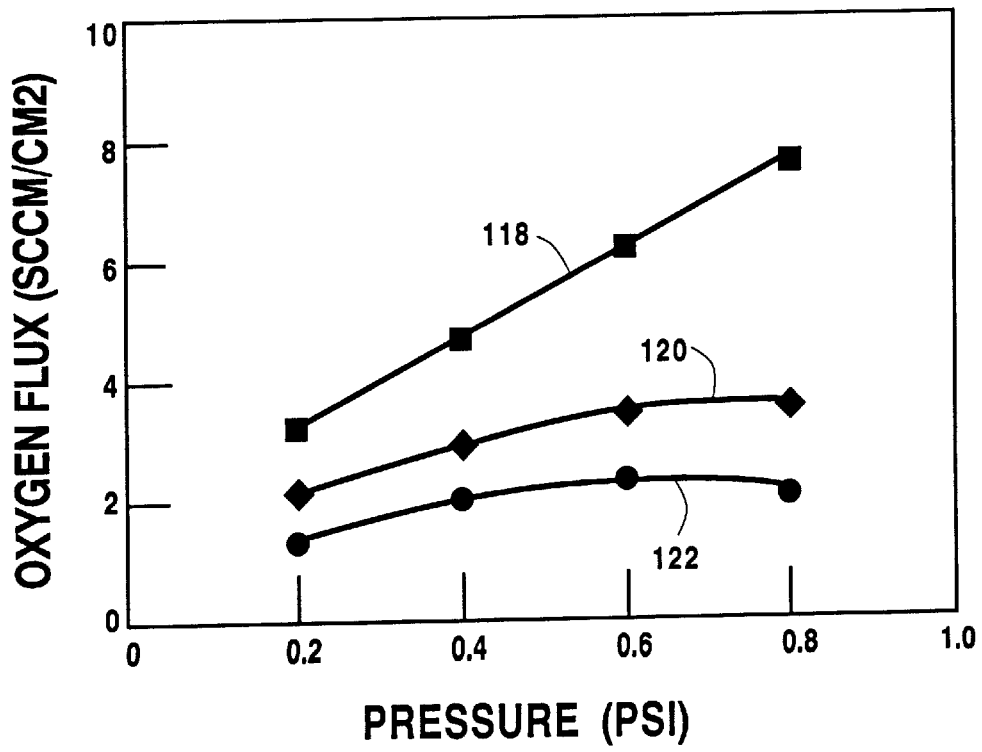
FIG. 2 is a graph of oxygen flux through the eighteen-coat composite of FIG. 1 and through two dense discs.

The oxygen permeation rate was measured using the Composite I disc specimen sealed in an alumina test cell with Ag paste. Permeation tests were performed at temperatures of 800–900° C. with He inert gas purge and different concentrations of $O_2/N_2$ mixtures on the feed side. A HP 5890 Gas Chromatograph and oxygen analyzer were used to analyze the gas compositions and calculate the oxygen fluxes. With 20% $O_2$ in the feed, measurements were taken using a helium purge of 500 sccm He at 800, 850 and 900° C. resulting in respective flux values of 0.00, 0.03, and 3.4 sccm/cm$^2$. It indicates a phase transformation of LSC between 850 and 900° C. from a hexagonal phase to a cubic phase. At 900° C. the oxygen permeation increases as the oxygen partial pressure increases. The oxygen fluxes measured were 3.4, 5.1, 6.8 and 8.2 sccm/cm$^2$, respectively, for the feed oxygen partial pressure of 0.2, 0.4, 0.6 and 0.8 atm as shown in FIG. 2. As compared to 1.0 mm thick LSC (curve 122) and 0.5 mm thick (curve 120) LSC-A discs, the composite specimen (curve 118) shows much higher oxygen fluxes under identical testing conditions. Especially for the feed oxygen partial pressure of 0.8 atm, a more than five times flux enhancement was demonstrated for the composite thin film specimen as compared to 1 mm thick dense disc.

EXAMPLE 2

Composite II

LSC Composite Film on Porous Substrate

Porosity Effect of Support

A composite LSC thin film (~2 µm) specimen, supported on a porous LSC-A substrate was prepared as described in Example 1. LSC-A substrates (0.5 mm thick) were prepared by mixing $La_{0.05}Sr_{0.95}CoO_3$ powder (PSC, Woodinville, Wash.) and 20 wt. % of Ag powder (Degussa Corp.), followed by pressing in a 1.5" die under a pressure of 10.4 kpsi and partial sintering at 900° C. to obtain a substrate with a porosity of about 32%. Lowering the sintering temperature increased the porosity of the support.

Figure 3:
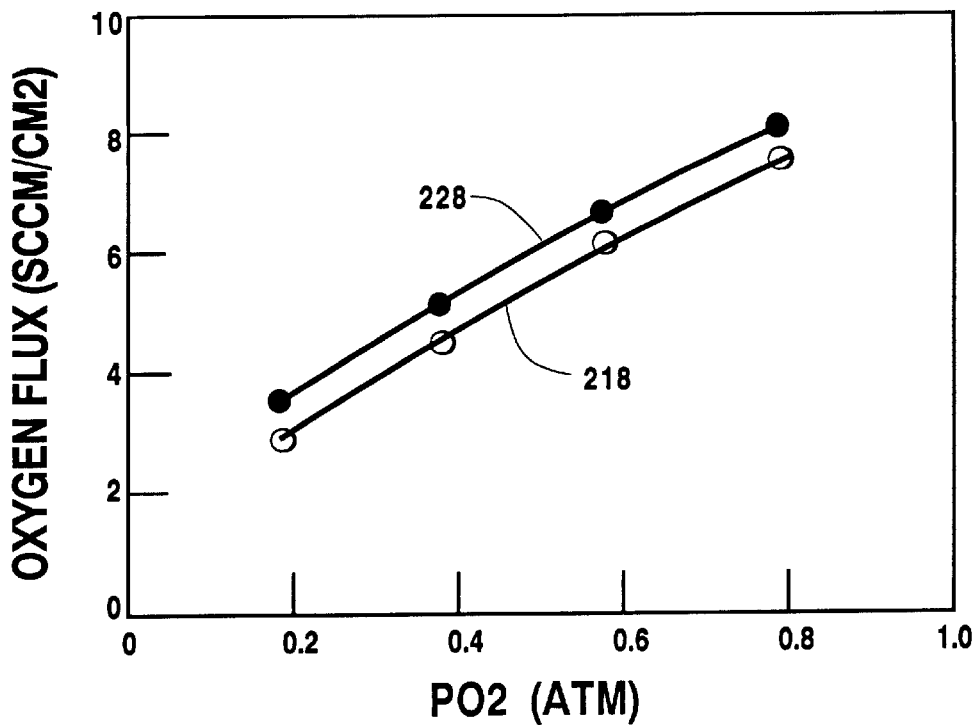
FIG. 3 is a graph showing the effect of substrate porosity on oxygen flux.

Oxygen permeation tests were performed at 900° C. under a $N_2$—$O_2$/He gradient as a function of feed oxygen partial pressure. The oxygen fluxes measured were 3.8, 5.8, 7.4 and 8.7 sccm/cm$^2$, respectively, for the feed oxygen partial pressure of 0.2, 0.4, 0.6 and 0.8 atm. As compared to composite film specimen with 25% porosity of substrate, curve 218, FIG. 3, the oxygen fluxes increased about 6–12% under similar testing conditions for the composite film specimen with 32% substrate porosity, curve 228. This indicates the oxygen flux of the composite film can be improved by increasing the porosity of the porous support.

EXAMPLE 3

Composite III

LSC Composite Film on Porous Substrate

Thickness Effect of Porous Support

A composite thin film (~2 µm) LSC specimen, supported on a porous LSC-A substrate was prepared as described in Example 1. LSC-A substrate (0.3 mm thick) was prepared by mixing the $La_{0.05}Sr_{0.95}CoO_3$ powder (PSC, Woodinville, Wash.) and 20 wt. % of Ag powders (Degussa Corp.), followed by pressing in a 1.5 inch die under a pressure of 10.4 kpsi and partial sintering at 900° C. to obtain a substrate with a porosity of about 32%. Oxygen permeation tests were performed at 900° C. under a $N_2$—$O_2$/He gradient as a function of feed $O_2$ partial pressure.

Figure 4:
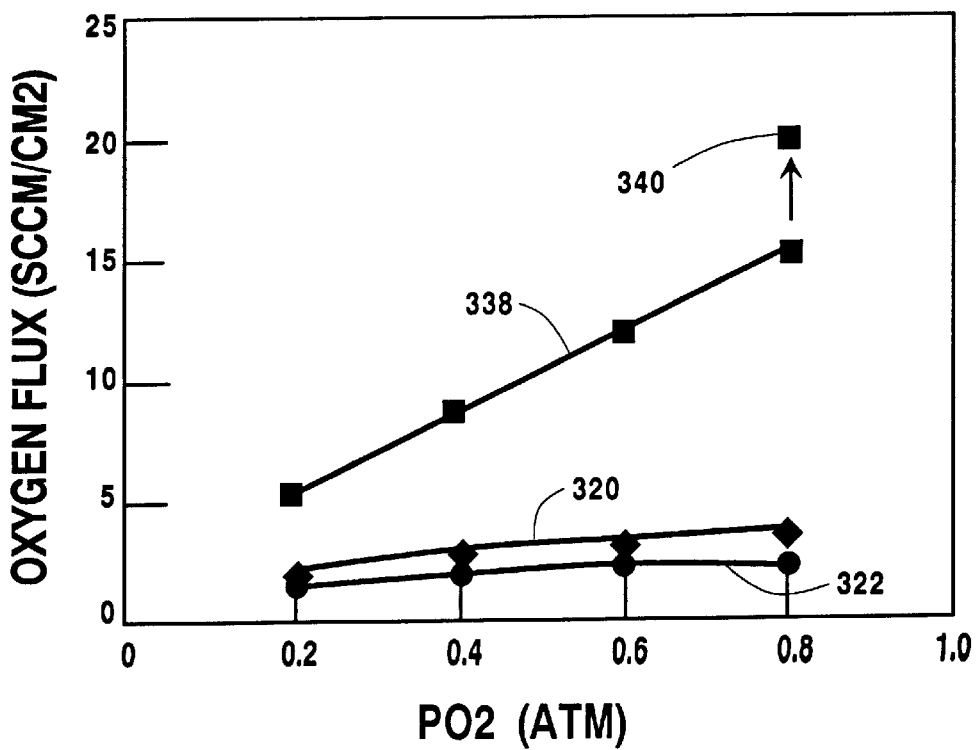
FIG. 4 is a graph of oxygen flux through another composite according to one embodiment of the invention and through two other dense discs.

The oxygen fluxes measured were 4.6, 8.3, 12.4 and 16.6 sccm/cm$^2$, curve 338, FIG. 4, for the feed oxygen partial pressure of 0.2, 0.4 0.6 and 0.8 atm, respectively. When purge flow was increased (from 0.5 to 2.8 lpm) the $O_2$ flux of 22.1 sccm/cm$^2$ was obtained as illustrated by data point 340. The results indicate that the oxygen flux of the composite film is not limited by surface exchange kinetics up to 22.1 sccm/cm$^2$ without using a surface catalyzed layer and is improved by reducing the thickness of the porous support. Curves 320 and 322 represent dense discs of LSC having thicknesses of 0.5 mm and 1.0 mm, respectively.

EXAMPLE 4

Effect of Nanocrystalline $La_{0.2}Sr_{0.8}Co_{0.8}Fe_{0.2}O_{3-x}$ (LSCF) Film on Surface Exchange Kinetics Preparation of the Polymeric Precursor Solution A polymeric precursor solution of $La_{0.2}Sr_{0.8}Co_{0.8}Fe_{0.2}O_{3-x}$ containing 0.2 mole of the oxide was prepared as follows: 1.732 g of $La(NO_3)_3 \cdot 6H_2O$, 3.386 g of $Sr(NO_3)_2$, 8.108 g of a 506.731 g sol/mole $Co(NO_3)_2$ solution and 2.748 g of a 686.979 g sol/mole $Fe(NO_3)_2$ solution were dissolved in 60 ml deionized water, one at a time, in a 250 ml beaker with stirring. 3.0 g glycine and 2.0 g citric acid and 40 ml ethylene glycol were then added to the solution and dissolved by stirring. The brown-colored precursor was filtered through Fisherbrand medium Q5 filter paper. The precursor was heated in a 250 ml beaker at 80° C. to expel the water and other volatile matter. After 24 hours, the precursor was transferred to a 100 ml beaker and allowed to concentrate at 80° C. for 2 more days until the precursor viscosity was 42 cps at room temperature.

Deposition and Formation of the Nanocrystalline LSCF Film on LSCF Substrate

A spin coating technique was used to form wet films of the precursor on the $La_{0.2}Sr_{0.8}Co_{0.8}Fe_{0.2}O_{3-x}$ substrate. LSCF substrate (1 mm thick) was prepared by mixing the $La_{0.2}Sr_{0.8}Co_{0.8}Fe_{0.2}O_{0.3-x}$ powder (PSC of Praxair Surface Technologies, Inc., Woodinville, Wash.) and approximately 3 wt. % of PVB binder (Butvar of Monsanto), followed by pressing in a 0.5" die under a pressure of 10.4 kpsi and sintering at 1250° C. for 4 hrs to obtain a dense substrate. A few drops of the viscous precursor were deposited onto the polished surface of the dense LSCF substrate which was fixed on a spinning disk. A spinning speed of 3500 rpm for 5 seconds was used for film deposition. After spin-coating, the as-deposited film of precursor on the substrate was dried on a hot plate at 80° C. for 5 minutes, then transferred to a ceramic-top hot plate and heated at approximately 300° C. for at least 5 minutes. The entire spin-coating and drying process was repeated 10 cycles until a approximately 1 µm thin film formed on the substrate surface, this composite film was then annealed at 600° C. for 2 hrs to form a LSCF nanocrystalline film (crystalline size approximately 20 nm, thickness approximately 1 µm) on a dense LSCF substrate.

Effect of Nanocrystalline LSCF Coating on Surface Exchange Kinetics

Figure 5A:
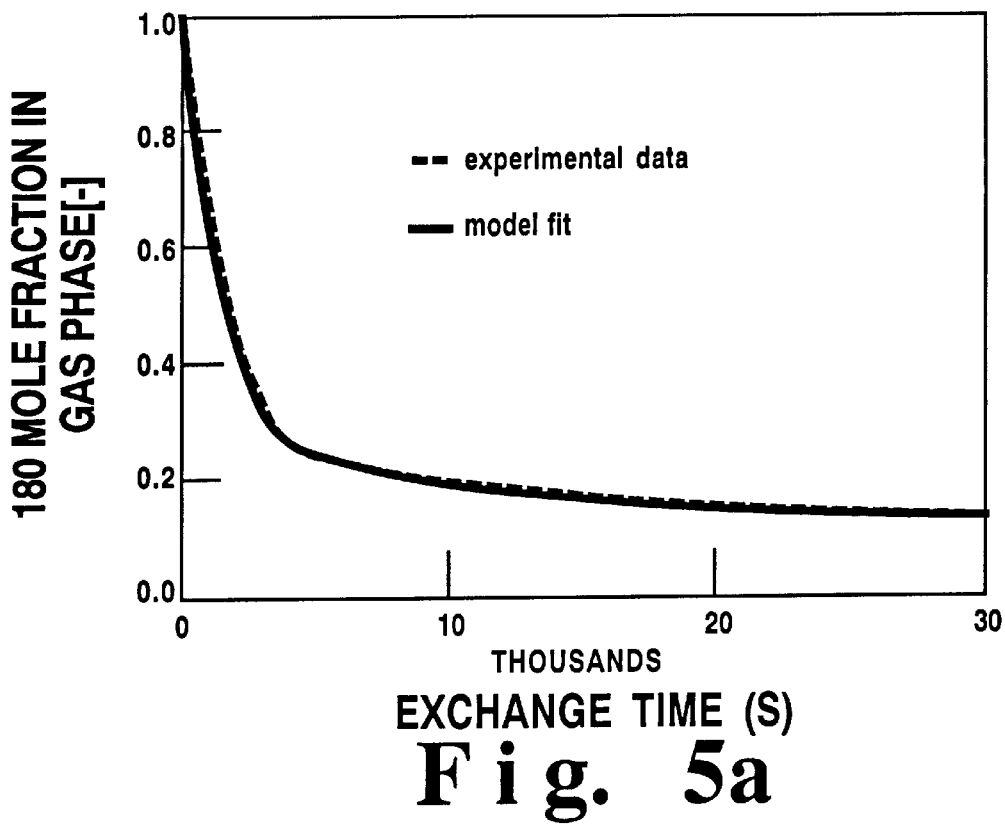
FIGS. 5a and 5b are graphs of $^{18}O$ isotope exchange data for coated and uncoated LSCF discs, respectively.
Figure 5B:
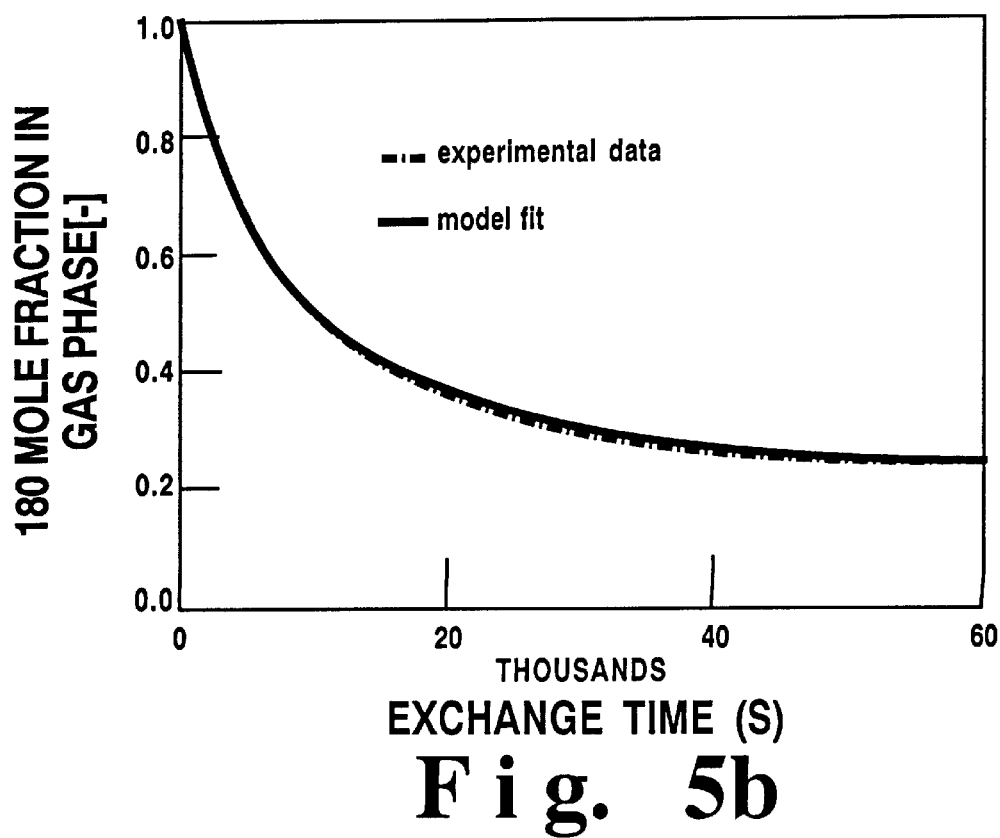

In order to study the effect of nanocrystalline coating on surface exchange kinetics of oxygen transport membranes, $^{18}O$ isotope exchange experiments were performed on LSCF discs with and without surface modification. A mass spectrometer was used to measure the change in the gas phase $^{18}O$ concentration with time at the University of Twente, Netherlands. From these data a surface oxygen exchange coefficient and an oxygen tracer diffusion coefficient was derived. FIG. 5a shows the result of an $^{18}O$ isotope exchange of LSCF disc coated with a nanocrystalline LSCF film (crystalline size approximately 20 nm, thickness approximately 1 μm) as described in last section. The rate of isotope exchange of the coated sample is clearly higher than that of the uncoated 1 mm thick dense LSCF sample (FIG. 5b). The surface oxygen exchange coefficient (k), tracer diffusion coefficient (D*) and critical thickness (D*/k) for the results are derived and shown in Table II. Coated LSCF membrane resulted in a 4–5 fold increase of the surface oxygen isotope exchange rate at 500° C. This indicates nanocrystalline coating can enhance surface exchange kinetics for the composite OTM applications.

Table II Oxygen tracer diffusion coefficient and surface exchange coefficient from $^{18}O$ isotope exchange and gas phase analysis for LSCF membranes with/without surface coating.

| Sample | Temperature/ ° C. | $PO_2$/bar | D* [cm$^2$/s] | k [cm/s] | D*/k [cm] |
|---|---|---|---|---|---|
| LSCF | 500.000 | 0.210 | 1.88*10$^{-8}$ | 8.63*10$^{-8}$ | 0.220 |
| LSCF + coating | 500.000 | 0.210 | 1.88*10$^{-8}$ | 4.60*10$^{-7}$ | 0.040 |

EXAMPLE 5

Fabrication of
$La_{0.19}Sr_{0.80}Fe_{0.69}Cr_{0.20}Co_{0.20}Mg_{0.01}O_3$ (LSFRCM)
Composite Film Preparation of the Polymeric Precursor Solution A polymeric precursor solution of LSFCRM containing 0.2 mole of the oxide was prepared as follows: 1.646 g of $La(NO_3)_3.6H_2O$, 3.386 g of $Sr(NO_3)_2$, 9.480 g of a 686.979 g sol/mole $Fe(NO_3)_2$ solution, 1.601 g of $Cr(NO_3)_3.9H_2O$, 1.013 g of a 506.731 g sol/mole $Co(NO_3)_2$ solution and 0.051 g of $Mg(NO_3)_2.6H_2O$ were dissolved in deionized water, one at a time, in a 250 ml beaker with stirring. 3.0 g of glycine and 2.0 g of citric acid and 40 ml of ethylene glycol were then added to the solution and dissolved by stirring. The brown-colored precursor was filtered through Fisherbrand medium Q5 filter paper. The precursor was heated in a 250 ml beaker at 80° C. to expel the water and other volatile matter. After 40 hours, the precursor was transferred to a 100 ml beaker and allowed to concentrate at 80° C. for 1 more day until the precursor viscosity of about 82 cP at room temperature.

Preparation of the Substrate

LSFCRM substrate (1 mm thick) was prepared by mixing LSFCRM powder (PSC, Woodinville, Wash.) and approximately 3 wt. % of 9VB binder (Butvar of Monsanto), followed by pressing in a 1.5" die under a pressure of 10.4 kpsi and partial sintering at 1000° C. to obtain a substrate with a porosity of approximately 32%.

Deposition and Formation of the Dense Film

A spin coating technique was used to form wet films of the precursor on the LSFCRM porous substrate. A few drops of the viscous precursor were deposited onto the polished surface of the substrate which was fixed on a spinning disk. A spinning speed of 3500 rpm for 5 seconds was used for film deposition. After spin-coating, the as-deposited film of precursor on the substrate was dried on a hot plate at 80° C. for 5 minutes, the transferred to a ion transport-top hot plate and heated at approximately 300° C. for at least 5 minutes. The entire spin-coating and drying process was repeated for thirty cycles until a dense thin film formed on the substrate surface.

EXAMPLE 6

Fabrication of $La_{0.05}Sr_{0.95}CoO_3$ Film by a
Polymeric Precursor With Colloidal Suspension In this Example, the polymeric precursor is introduced into the colloidal suspension system to increase the inorganic content of the system and reduce the shrinkage mismatch between film and substrate during sintering. A colloidal system consists of a dispersed phase (or discontinuous phase) distributed uniformly in a finely divided state in a dispersion medium (or continuous phase). Classical colloidal systems involve dispersions for which at least one dimension of dispersed phase lies in the range of 1–1000 μm, i.e. between 10 Å and 1 μm. In applied colloidal systems the upper size limit is commonly extended to at least 10,000 to 100,000 μm. In colloidal systems according to the present invention, the dispersed powder size is preferably less than 50 μm, more preferably less than 1 μm, and most preferably less than 0.1 μm. The polymeric precursor is used as a binder and stabilization agent in the ion transport suspension to increase the stability of the system. Usually composition of the polymeric precursor is identical to that of ion transport in the liquid suspension to obtain the desired composition of films. By using this liquid precursor, crack-free ION TRANSPORT films can be achieved with the thickness greater than 0.5 μm for a single coating step. Table II illustrates the formulation to prepare the liquid precursor of LSC for the composite ION TRANSPORT film fabrication.

TABLE III

Formulation Used for Preparing LSC Liquid Precursor

| Component | Quantity | Function |
|---|---|---|
| Part A | | |
| LSC | 20 g | ION TRANSPORT fine powder |
| Polypropylene Glycol | 1.67 g | Anti-foaming |
| Darvn C | 0.80 g | Dispersant |
| Water (or Ethylene Glycol) | 50 g | Solvent |
| Part B | | |
| Polymeric Precursor of LSC | 40.5 g | Binder |

The liquid precursor is prepared by adding Part A into a polyethylene bottle and ball-milling with YSZ balls for 18–24 hours. If the ion transport powder is sensitive to water, an ethylene glycol can be a substitute for the solvent. Component for part B is prepared by the process described in Example 1. Part B is then added to Part A and the mixture ball-milled for additional 4 hours. This liquid precursor then is ready for the film fabrication by dip coating or spray coating techniques. It can be used to fabricate the ion transport films with the thickness in the range of 2–5 μm for the tubular or complex composite elements.

The invention disclosed herein is especially useful for fabricating thin films of mixed conducting oxides presented by the structure: $A_rA'_sA''_tB_uB'_vB''_wO_x$ where A, A', A" are chosen from the groups 1, 2, 3 and the F block lanthanides;

and B, B', B" are chosen from the D block transition metals according to the Periodic Table of the Elements adopted by the IUPAC wherein $0<r \leq 1$, $0 \leq s \leq 1$, $0 \leq t \leq 1$, $0 \leq u \leq 1$, $0 \leq v \leq 1$, $0 \leq w \leq 1$ and x is a number which renders the compound charge neutral. Preferably, A, A', A" of the enumerated structure is a Group 2 metal consisting of magnesium, calcium, strontium and barium. Preferred mixed conducting oxides are presented by the formula $A'_s A''_t B_u B'_v B''_w O_x$ where A represents a lanthanide, Y, or mixture thereof, A' represents an alkaline earth metal or mixture thereof; B represents Fe; B' represents Cr, Ti, or mixture thereof and B" represents Mn, Co, V, Ni, Cu or mixture thereof and s, t, u, v, and w each represents a number from 0 to about 1. The present invention is also useful for other thin film mixed conductors disclosed in the following U.S. Patents, all of which are incorporated herein by reference: U.S. Pat. No. 5,702,999 (Mazanec et al.); U.S. Pat. No. 5,712,220 (Carolan et al.) and U.S. Pat. No. 5,733,435 (Prasad et al.).

The present invention encompasses methods of coating deployment on the different substrates including:

1) spin coating of liquid precursors;

2) dip coating of liquid precursors;

3) spray coating of liquid precursors;

4) slip casting of liquid precursors;

5) thermal spray, plasma spray; and 6) combinations thereof.

The term "comprising" is used herein as meaning "including but not limited to", that is, as specifying the presence of stated features, integers, steps or components as referred to in the claims, but not precluding the presence or addition of one or more other features, integers, steps, components, or groups thereof. Alternative embodiments will be recognized by those skilled in the art and are intended to be included within the scope of the claims.

What is claimed is:

1. A method of fabricating a ceramic membrane comprising:

providing a colloidal suspension of a ceramic powder;

providing a polymeric precursor comprising a polymer containing metal cations;

mixing the polymeric precursor together with the colloidal suspension;

applying the mixture to a membrane support to form a composite structure; and heating the composite structure to form a dense membrane on the membrane support.

2. The process of claim 1 wherein the colloidal suspension includes a water-based solvent.

3. The process of claim 2 wherein the solvent is water or ethylene glycol.

4. The process of claim 1 wherein the ceramic powder has a mean particle size of less than 50 microns in diameter.

5. The process of claim 1 wherein substantially all of the ceramic powder has a diameter less than 1 micron.

6. The process of claim 2 wherein the colloidal suspension further includes at least one of a dispersant and an anti-foaming agent.

7. The process of claim 1 wherein providing the polymeric precursor includes:

preparing a first solution by dissolving a plurality of metal cation source compounds in an aqueous mixture including a polymerizable organic solvent; and heating the first solution to form the precursor as a polymer containing the metal cations.

8. The process of claim 7 wherein the metal cations are the same as those in the ceramic powder in the colloidal suspension.

9. The process of claim 1 wherein the support is porous.

10. The process of claim 9 wherein the support has a porosity of at least 10 percent by volume.

11. The process of claim 1 in which heating the applied mixture includes drying the applied mixture on the support and then annealing it to form the dense membrane on the substrate.

12. The process of claim 11 in which annealing includes at least partially sintering the support.

13. The process of claim 1 further including eliminating defects in the formed dense membrane by:

preparing a second solution by dissolving a plurality of metal cation source compounds in an aqueous mixture including a polymerizable organic solvent;

heating the second solution to form a sealing precursor as a polymer containing the metal cations; and applying the sealing precursor to the formed dense membrane to establish a film thereon.

14. The process of claim 13 further including spinning the composite structure after the sealing precursor is applied.

15. The process of claim 14 in which the steps of claims 13 and 14 are repeated at least twice.

16. The process of claim 13 wherein the film has a crystalline size of less than 100 nm.

17. The process of claim 15 wherein the film has a crystalline size of less than 50 nm.

18. A method of fabricating a ceramic membrane, comprising:

providing a colloidal suspension of a ceramic powder, the colloidal suspension including a water-based solvent, and substantially all of the ceramic powder having a diameter of less than 1 micron;

providing a polymeric precursor, including preparing a first solution by dissolving a plurality of metal cation source compounds in an aqueous mixture including a polymerizable organic solvent, and heating the first solution to form the precursor as a polymer containing the metal cations;

mixing the polymeric precursor together with the colloidal suspension;

applying the mixture to a membrane support to form a composite structure; and heating the composite structure to form a dense membrane on the support.

19. The process of claim 18 wherein the colloidal suspension further includes at least one of a dispersant and an anti-foaming agent.

20. The process of claim 19 in which heating the applied mixture includes drying the applied mixture on the support at about 60–100° C. for 5–30 mins and then annealing it at about 600–1400° C. for 2–4 hrs to form the dense membrane on the substrate.

* * * * *